United States Patent [19]

Furlong et al.

[11] Patent Number: 4,501,293
[45] Date of Patent: Feb. 26, 1985

[54] GAS FLOW RESPONSIVE SIGNAL OUTPUT MEANS

[75] Inventors: Owen D. Furlong, East Coker, Near Yeovil; Leonard Moore, Somerton; Jonathan D. Ward, Ilminster, all of England

[73] Assignee: Normalair-Garrett (Holdings) Limited, Yeovil, England

[21] Appl. No.: 416,026

[22] Filed: Sep. 8, 1982

[30] Foreign Application Priority Data

Sep. 9, 1981 [GB] United Kingdom ............... 8127270

[51] Int. Cl.³ .................. F16K 37/00; F15C 4/00; G01L 9/00
[52] U.S. Cl. .................... 137/557; 137/804; 137/818; 137/819; 73/705; 73/861.47; 73/861.53; 128/205.23
[58] Field of Search ............. 137/804, 818, 819, 832, 137/840, 557, 486, 500; 73/705, 861.47, 861.53; 128/205.23

[56] References Cited

U.S. PATENT DOCUMENTS

| | | | |
|---|---|---|---|
| 3,378,022 | 4/1968 | Sorenson | 137/486 |
| 3,457,847 | 7/1969 | Furlong | 137/865 |
| 3,502,892 | 3/1970 | Brittain | 73/705 |
| 3,590,843 | 7/1971 | Meyer | 137/804 |
| 3,623,053 | 11/1971 | Meyer | 137/804 |
| 4,066,095 | 1/1978 | Massa | 137/486 |
| 4,083,425 | 4/1978 | Osborn | 73/861.53 |
| 4,200,120 | 4/1980 | Kimata et al. | 137/613 |
| 4,407,153 | 10/1983 | Furlong et al. | 137/804 |
| 4,414,982 | 11/1983 | Durkon | 128/205.23 |

FOREIGN PATENT DOCUMENTS

| | | | |
|---|---|---|---|
| 0012527 | of 0000 | Japan | 73/705 |
| 992766 | 5/1965 | United Kingdom | 128/205.23 |

Primary Examiner—A. Michael Chambers
Attorney, Agent, or Firm—Larson & Taylor

[57] ABSTRACT

Signal output means (11) responsive to gas flow and particularly suited for use in gas flow indicator apparatus (10), has first and second pressure-datum valves (24, 25) arranged in downstream order in a gas conduit (16), the second pressure-datum valve (25) being arranged to open at a lower pressure difference than the first pressure-datum valve (24). A flueric amplifier (15) has a power jet port (28) connected to the gas conduit (16) on the upstream side of the first pressure-datum valve (24), opposed control pressure ports (26, 27) connected respectively to a chamber (22) formed between the first and second pressure-datum valves (24, 25) and to the gas conduit (16) downstream of the second pressure-datum valve (25), and a vent port (30) also connected to the gas conduit (16) downstream of the second pressure-datum valve (25). A pressure signal output by the flueric amplifier (15) in response to gas flow through the conduit (16) may be used to trigger a visual or audio warning device (14).

8 Claims, 1 Drawing Figure

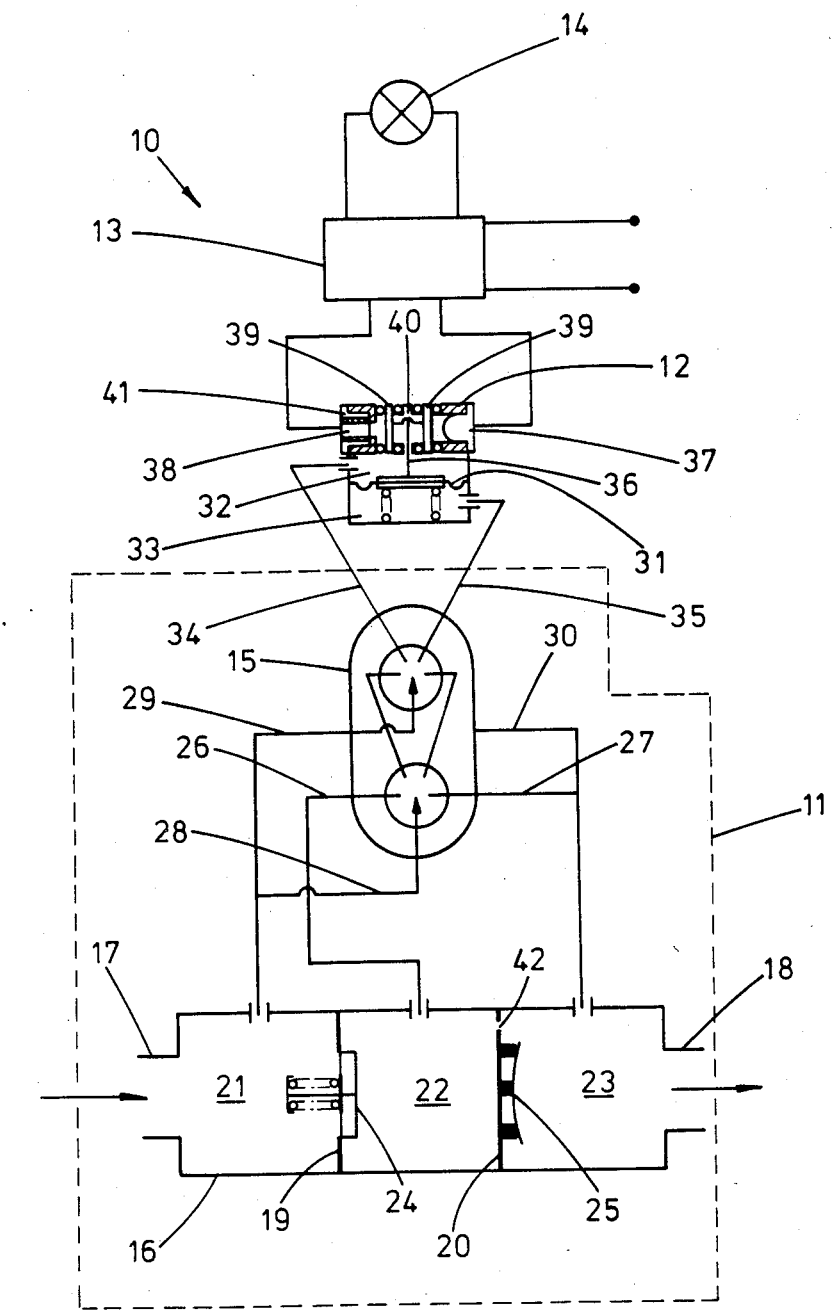

GAS FLOW RESPONSIVE SIGNAL OUTPUT MEANS

DESCRIPTION OF INVENTION

This invention relates to gas flow responsive signal output means and is particularly, but not exclusively, concerned with such means for use in gas flow indicator, or warning, apparatus.

Gas flow indicator apparatus has a position of utility in many gas delivery systems and one of necessity in most breathable gas delivery systems such as, for example, those in aircraft which deliver breathable gas to the aircrews. Aircraft systems are generally of the demand supply type, delivering cyclically in response to a user's breathing pattern by way of a demand regulator.

Gas flow indicator apparatus in an aircraft oxygen delivery system is required, at the lowest pressure value, to respond to a gas flow rate corresponding to a minimum predicted light breathing condition and yet be unresponsive to small rates of leakage up to, say 2 liters/minute such as are allowable from around the face seal of the oronasal breathing mask of an aviator and which may occur more particularly while a positive pressure is being maintained therein.

A gas flow indicator apparatus which is currently used in aircraft oxygen delivery systems comprises a bobbin operating in a fine clearance bore adjacent to which is situated a magnetic reed switch, such that movement of the bobbin along the bore in response to oxygen flow brings it into a position in which it influences the reed switch to affect an electrical circuit to activate an indicator.

This gas flow indicator apparatus has disadvantages both in its manufacturing requirement and in its operation. In manufacture it requires considerable high quality machining to obtain the fine dimensional tolerances necessary to ensure that it functions within predetermined operating limits. In operation it has been found not to be always reliable, with such faults occurring as those of the bobbin tilting and sticking, and the reed switch failing to operate.

The present invention aims to provide gas flow responsive signal output means which is particularly, but not exclusively, suited for incorporation in gas flow indicator apparatus.

The invention further aims to provide gas flow indicator apparatus which overcomes the disadvantages of the known apparatus by obviating the use of a bobbin and reed switch and which is, therefore, less exacting in manufacturing requirements, and more reliable in operation whilst enabling finer limits of operation.

Accordingly, one aspect of the present invention provides signal output means responsive to gas flow, comprising a gas conduit having first and second pressure-datum valves arranged in downstream order and forming a chamber therebetween, the second pressure-datum valve being arranged to open at a lower pressure difference than is required for opening the first pressure-datum valve; and a flueric amplifier having a power jet port connected with the gas conduit on the upstream side of the first pressure-datum valve, opposed control pressure ports connected respectively with the chamber in the gas conduit between the first and second pressure-datum valves and with the gas conduit downstream of the second pressure-datum valve, and a vent port also connected to the gas conduit downstream of the second pressure-datum valve.

The arrangement of the gas conduit and pressure-datum valves, and the connections of the flueric amplifier to the gas conduit is such that an output pressure signal is obtained from the flueric amplifier in response to gas flow through the gas conduit.

By the term "pressure-datum valve" we mean a valve arranged to open when a predetermined pressure difference obtains across it and to close when the pressure difference falls to a lower value. Hereinafter the term pressure-datum valve will be abbreviated to PDV.

To obtain indication of gas flow of low rate it is preferred that the flueric amplifier is of the laminar flow type. The amplifier may include more than one stage of amplification.

In a preferred embodiment, the gas conduit is a manifold comprising a generally tubular gas flow chamber having inlet and outlet conduit connections, the gas flow chamber being divided into three sub-chambers by two walls, one of which walls incorporates the first PDV and the other of which walls incorporates the second PDV.

Signal output means responsive to gas flow in accordance with the invention is particularly suited for use with gas flow indicator or warning apparatus, the output pressure signal of the flueric amplifier in response to gas flow through the manifold being used to trigger a visual or audio warning device.

Accordingly another aspect of the invention provides gas flow indicator apparatus comprising a manifold having first and second pressure-datum valves arranged in downstream order and forming a chamber therebetween, the second pressure-datum valve being arranged to open at a lower pressure difference than is required for opening the first pressure-datum valve; a flueric amplifier having a power jet port connected with the manifold on the upstream side of the first pressure-datum valve, opposed control pressure ports respectively connected with the manifold chamber between the first and second pressure-datum valves and with the manifold downstream of the second pressure-datum valve, a vent port also connected to the manifold downstream of the second pressure-datum valve and output pressure signal ports connected to a pressure responsive switch having electrical connection with an indicator device.

The pressure responsive switch may comprise a photo-electric unit having a pressure responsive occludent member adapted for interrupting a light beam, and having electrical connection with the indicator device by way of a switching circuit.

Preferably the pressure responsive occludent member comprises a movable wall, such as a flexible diaphragm, carrying an upstanding tongue or shutter. Preferably the tongue or shutter operates wholly within the photo-electric unit, so as to avoid sealing problems, and the path of the light-beam is by way of suitable windows in walls of the unit.

An embodiment of the invention will now be described, by way of example, with reference to the single FIGURE of the accompanying drawing, which schematically illustrates gas-flow indicator apparatus that is suitable for use with an aircraft breathing gas delivery system of the demand supply type.

The gas flow indicator apparatus generally indicated at 10 in the drawing is intended to monitor the flow of oxygen in an aircraft breathing gas delivery system and comprises signal output means 11, responsive to the gas flow, fluidly connected to a pressure responsive photo-electric unit 12 which is in turn electrically connected to a switching circuit 13 that controls an indicator 14, such as a lamp or, preferably, a dolls-eye indicator.

The signal output means 11 comprises a two-stage laminar flow flueric amplifier 15 of known type which is fluidly connected to and which may be integral with a manifold 16 that constitutes a conduit for the gas (oxygen) the flow of which is to be monitored. The manifold 16 is of generally tubular form and comprises a gas flow chamber having inlet and outlet conduit connections 17 and 18, respectively. The gas flow chamber is divided by two transverse walls 19 and 20 into three sub-chambers 21, 22 and 23. The walls 19 and 20 incorporate pressure-datum valves (PDV's) 24 and 25, respectively. The upstream or first PDV 24 is a metal poppet valve arranged to open against a low rate compression spring and to close on to a slightly resilient rubber seating, and the downstream or second PDV 25 is of mushroom form moulded in a resilient rubber and is similar to the inspiratory valves in contemporary oronasal breathing masks used by aviators. The second PDV 25 is lightly urged towards closing onto its associated seat by having its centre held slightly below the plane of the seat. Each of the PDV's 24 and 25 is arranged to open when a predetermined pressure difference obtains across it; the first PDV being arranged to crack with a pressure difference of 13.7 kPa (2 PSI) across it, and the second PDV being arranged to crack with a pressure difference of 0.5 kPa (2 ins. WG) across it. When demand downstream of the second PDV 25 is such as to create a flow rate of 3.5 liters/minute or above, the predetermined pressure differences will obtain across PDV's 24 and 25 and they will both be open. When the demand reduces so that the flow rate falls to 2.0 liters/minute or below, the pressure differences across the PDV's 24 and 25 will fall to below their predetermined opening values and they will both be closed.

One control pressure port 26 of the flueric amplifier 15 is fluidly connected to the centre sub-chamber 22 of the manifold 16, which sub-chamber is defined between the transverse walls 19, 20. The opposing control pressure port 27 is connected to the downstream sub-chamber 23, as is also the amplifier vent port 30. The power jet ports 28 and 29 are fluidly connected to the upstream sub-chamber 21.

The pressure responsive photo-electric unit 12 comprises a pressure chamber divided by a spring biased diaphragm 31 into two sub-chambers 32, 33 which are connected to the output signal ports 34 and 35, respectively, of the flueric amplifier 15. The diaphragm 31 carries an upstanding tongue or shutter 36 which, under the influence of the diaphragm spring, tends to be urged into a position for interrupting the light path between a light emitting diode 37 and a light-activated switch in the form of a photo diode 38. These two switches are housed in a cover of sub-chamber 32. This cover holds opposed windows 39, sealed by O-rings, in part of the wall of the sub-chamber 32 defined by a receptacle 40, the windows 39 thus defining part of the light path between the diodes 37, 38 and enabling the shutter 36 to be wholly within the sub-chamber 32. The diodes are electrically connected to the light operated switching circuit 13 and thereby to a power source and to the indicator 14.

The inlet connection 17 of the manifold 16 preferably houses a filter (not shown).

In operation the oxygen flow indicator apparatus 10 is connected into an oxygen delivery system (not shown) such that oxygen in feeding to an aviator passes through the manifold 16 from inlet 17 to outlet 18 before entry to a demand type oxygen delivery regulator (not shown). With a supply made available for the aviator to draw upon when he needs oxygen, the pressure in the manifold is at say, 483 kPa (70 PSI) and, during the 'no flow' condition, this pressure is present throughout the fluidly connected portions of the apparatus 10 comprising the signal output means 11, and the two sub-chambers 32 and 33 of the photo-electric unit 12. Thus during such condition there is no difference in fluid pressure across the PDV's 24 and 25 in the manifold 16 nor across the diaphragm 31 which defines the two sub-chambers 32 and 33 of the photo-electric unit 12. However, the effect of the spring bias upon the diaphragm 31 urges the shutter 36 into a position interrupting the light beam between the two diodes 37 and 38, whereby the switching circuit 13 maintains the indicator 14 in a chosen state.

Upon inhalation by the aviator a reduction in pressure occurs downstream of the oxygen delivery regulator (not shown), whereby the demand valve therein opens to permit gas to flow from the downstream sub-chamber 23 of the manifold 16, and the pressure in sub-chamber 23 reduces, initially to the extent that a pressure difference (i.e. 0.5 kPa (2 ins. WG) obtains across the second PDV 25 sufficient to open it. By reason of the connections of vent port 30 and control pressure port 27 to the sub-chamber 23, the reduction in pressure in the latter energizes the amplifier and the pressure difference across the PDV 25 also appears across the control pressure port 26 and the opposing control pressure port 27, causing a control jet to issue from the control pressure port 26. The jet from port 26 deflects the first stage power jet at port 28 to the right as seen in the drawing and, in the usual manner of this type of flueric amplifier, establishes a control jet issuing from the right, to deflect to the left, the second stage power jet issuing from port 29. Thus an output pressure signal is established at port 34 and fed into sub-chamber 32 of the photo-electric unit 12, while pressure in sub-chamber 33 is bled by way of signal port 35 and vent port 30 into the manifold sub-chamber 23. As the pressure in the sub-chamber 22 falls in consequence of the gas flow through the PDV 25, the pressure difference across the PDV 24 increases until it attains the value (13.7 kPa, 2 PSI) at which the PDV 24 opens. The amplifier develops its full output under these conditions and the gas pressure difference thereby created across the diaphragm 31 that separates the sub-chambers 32 and 33 is sufficient to overcome the diaphragm biasing spring and so cause the tongue 36 to be drawn from the position in which it occludes the light beam path between the two diodes 37 and 38. The uninterrupted light beam affects the switching circuit 13 and the indicator 14 is caused thereby to adopt an alternative state, to indicate the existence of a flow of gas through the manifold.

As the inhalatory phase of the aviator's breathing cycle terminates, the demand valve of the oxygen delivery regulator (not shown) closes and a pressure balance across the PDV's 24 and 25 and across the diaphragm 31 is reinstated so that the tongue 36 is again moved, under the influence of the diaphragm biasing spring, into position to occlude the light beam path and actuate the switching circuit 13 to restore the indicator 14 to its "no-flow" indicating state.

The first PDV 24 determines the gas pressure at which the flueric amplifier power jets 28 and 29 operate, whilst the second PDV 25 determines the gas pressure across the first stage control ports 26 and 27.

It will be understood that without opening of the PDV's 24 and 25, a small flow may occur via. the power jets 28 and 29 and the vent port 30 and control port 27. This small flow, which will not cause a flow indication by operation of the indicator 14, may be sufficient to accommodate leakage from a system in which the apparatus 10 is incorporated, such as a predetermined allowable leakage from around the face seal of an oronasal mask. However, if the allowable leakage rate is slightly greater than this accommodation permits, the control pressure port 26 may be used to supplement the leakage flow by inclusion of a small, e.g. 76 mm, orifice 42 in the transverse wall 20 that houses the second PDV 25, whereby gas flow indication is prevented until flow through the system is greater than the maximum allowable leakage.

A gas flow indicator apparatus as hereinbefore described with reference to and illustrated in the accompanying drawing has been shown to work effectively with gas supply pressures ranging between 2.75 kPa (4 PSI) and 1035 kPa (150 PSI).

Of course modifications may be introduced, for example, pressure-datum valves of alternative construction may be employed, whilst the output pressure signal of the gas flow responsive signal output means may be combined with any suitable associable apparatus.

What is claimed is:

1. Signal output means responsive to gas flow, comprising a gas conduit having first and second pressure-datum valves arranged in downstream order and forming a chamber therebetween, the second pressure-datum valve being arranged to open at a lower pressure difference than is required for opening the first pressure-datum valve; and a flueric amplifier having a power jet port connected with the gas conduit on the upstream side of the first pressure-datum valve, opposed control pressure ports connected respectively with the chamber in the gas conduit between the first and second pressure-datum valves and with the gas conduit downstream of the second pressure-datum valve, and a vent port also connected to the gas conduit downstream of the second pressure-datum valve.

2. Signal output means as claimed in claim 1, wherein the flueric amplifier is of laminar flow type.

3. Gas flow indicator apparatus comprising a manifold having first and second pressure-datum valves arranged in downstream order and forming a chamber therebetween, the second pressure-datum valve being arranged to open at a lower pressure difference than is required for opening the first pressure-datum valve, a flueric amplifier having a power jet port connected with the manifold on the upstream side of the first pressure-datum valve, opposed control pressure ports respectively connected with the manifold chamber between the first and second pressure-datum valves and with the manifold downstream of the second pressure-datum valve, a vent port also connected with the manifold downstream of the second pressure-datum valve, and output pressure signal ports connected to a pressure responsive switch having electrical connection with an indicator device.

4. Gas flow indicator apparatus as claimed in claim 3, wherein the flueric amplifier is of multi-stage laminar flow type.

5. Gas flow indicator apparatus as claimed in claim 3, wherein the pressure responsive switch comprises a photo-electric unit having a pressure responsive occludent member adapted for interrupting a light beam, and having electrical connection with the indicator device by way of a switching circuit.

6. Gas flow indicator apparatus as claimed in claim 5 wherein the pressure responsive occludent member comprises a movable wall carrying an upstanding tongue.

7. Gas flow indicator apparatus as claimed in claim 6 wherein the movable wall comprises a flexible diaphragm.

8. Gas flow indicator apparatus as claimed in claim 6 wherein the tongue operates wholly within the photo-electric unit and the path of the light beam is by way of windows in wall of said unit.

* * * * *